Patented May 19, 1925.

1,537,997

UNITED STATES PATENT OFFICE.

TAKEO MIYAGUCHI, OF TOKYOFU, JAPAN.

METHOD OF MAKING IRON AND STEEL.

No Drawing.  Application filed October 19, 1921. Serial No. 508,816.

*To all whom it may concern:*

Be it known that I, TAKEO MIYAGUCHI, subject of the Emperor of Japan, and resident of Sendagayamachi, Toyotamagori, Tokyofu, Japan, have invented certain new and useful Improvements in the Methods of Making Iron and Steel, of which the following is a specification.

This invention relates to a method of making, iron or steel on an industrial scale, said iron or steel containing a very low percentage of nitrogen, manganese, sulphur and phosphorus, the iron or steel to be made from the raw materials such as iron ore, pig iron, scrap iron or scrap steel or the like which contains a certain amount of the above constituents. It is characterized by the utilization of boron or ferro-boron in the course of treatment relating to the manufacture of iron or steel. It has hitherto been proposed to manufacture boron iron or boron steel, but as far as I am aware, the method was merely experimental as described in "General Electric Review" published in November 1918. In my invention either boron or ferro-boron is used in place of a deoxidizing agent or agents such as ferro-silicon, ferro-manganese or aluminium in which case boron or ferro-boron acts as a deoxidizing agent as well as a denitrating agent, dephosphorating agent and desulphurating agent. In the process hitherto known, it was simply an alloyed process of boron and iron.

In my process, a finely powdered mixture of boron oxide and a deoxidizing agent such as carbon, may be used in place of boron or ferro-boron.

One object of the invention is to produce iron or steel containing a low percentage of manganese, from iron ore, pig iron, scrap iron or scrap steel, each of which normally contains a certain amount of manganese and from which the manganese has been previously eliminated by any known method. It is then deoxidized by the action of boron or ferro-boron. Another object of the invention is to produce iron or steel containing a low percentage of nitrogen by the aid of the combining action of metallic boron with nitrogen contained in the molten iron or steel. A further object of the invention is to eliminate phosphorus and sulphur from molten iron or steel containing a certain amount of these ingredients, by treating the molten charge with ferro-boron or metallic boron.

My process is as follows:

First step. Melt the raw material and add a certain amount of slag, and when iron ore or the like is used as raw material it is melted with carbon to reduce it.

Second step. As in the methods hitherto used, there is added a certain amount of oxide of iron to slightly oxidize the charge, and then carbon, silicon, manganese and some of the phosphorus oxidizes and enters into the slag. By this treatment can be obtained a charge containing less than 0.10 per cent of manganese and silicon. The slag is replaced several times, if desired, to clear the silicon, manganese, and phosphorus.

Third step. Add boron or ferro-boron to the charge and cover it with new slag. Hereupon, this metal energetically combines with oxygen, nitrogen, sulphur and phosphorus, whereby the desired treatment is completed. Finally add the desired percentage of carbon, etc., to arrive at the desired composition of the steel.

Now first I will describe about manganese. In the method of manufacture of iron or steel from iron ores, pig iron, scrap iron, scrap steel or the like, it has been customary to use ferro-silicon, ferro-manganese, aluminium or ferro-titanium as deoxidizing agents, regardless of whether or not the charge contain a percentage of manganese. But in case of the employment of ferro-silicon alone as a deoxidizing agent, silicon remains as a residue, the action being imperfect. If ferro-manganese be used together with ferro-silicon as a deoxidizing agent, there may be a uniform distribution of the same within the molten iron or steel and the charge will be fully deoxidized, but it is impossible to obtain a steel containing a low percentage of manganese. Further, in the case of aluminium, the desired treatment would be very costly and when a certain quantity of aluminium remains as a residue, it is quite detrimental to the desired product. If ferro-titanium be used, its specific gravity is so low, that it will come to suspension in the upper part of the charge on which account it is difficult to obtain a product of uniform and homogeneous quality.

In general the elimination of manganese from iron or steel containing a certain percentage of manganese may be carried out as heretofore principally in electric furnaces or Bessemer converters. In the manufacture of steel in electric furnaces, when iron oxide or iron ores are supplied to molten iron or steel and the latter are maintained in oxidizing condition, carbon, silicon and manganese will be removed. In case of the employment of Bessemer converters in the same art, carbon, silicon, manganese etc., will also be eliminated from the molten iron by subjecting the latter to an air blast, but manganese thus eliminated from molten iron or steel will enter into the slag which is used on the surface of the molten charge and since the produced molten iron or steel remains in an oxidized condition, it is essential to reduce it. For this purpose if a reducing agent such as ferro-silicon or the like be introduced, a portion of manganese oxide in the slag will also be reduced to metallic manganese so as to combine with the molten iron or steel. In consequence it becomes essential to remove the slag from the furnace as the means of clearing the manganese. From the foregoing it is quite evident that the method commonly used in the manufacture of iron or steel as above outlined is rather complicated, ineffective and therefore uneconomical compared with my process. In my process, although deoxidation can be performed simply by use of boron or ferro-boron instead of other deoxidizing agents as heretofore mentioned, I still may use these other agents in the initial step of deoxidation and then use boron or ferro-boron as a deoxidizing agent in the final treatment.

The following exemplify the tests of chemical analysis and of tensile strength and elongation made on iron and steel manufactured by my invention:

| Test Sample. | Carbon in per cent. | Manganese in per cent. | Tensile strength. per square mm. | Elongation. per cent. |
|---|---|---|---|---|
| Electric steel | 0.7 | 0.05 | 63.67 kilgrm. | 25.00 |
| Electric steel | 1.08 | Trace | 70.67 | 17.87 |
| Electric steel | 1.10 | 0.08 | 72.33 | 17.00 |
| Soft iron made by electric furnace. | 0.132 | Trace | 36.73 | 41.66 |

I will now describe the invention with regard to the nitrogen. The iron and steel on the market is produced by cupola, Siemens furnace, Bessemer converter, crucible furnace or electric furnace, and the metal produced by the employment of any one of the above means will unavoidably contain a certain percentage of nitrogen.

It has been hitherto recognized that the nitrogen contained in iron or steel gives rise to an undesirable result so that such metal containing 0.008 per cent of nitrogen is said to be fragile.

If iron or steel is manufactured by electric furnace with cold scrap as a charge, there is a tendency of the nitrogen being fixed to the iron in the treatment by the action of the electric arc. It follows therefore that iron or steel manufactured by an electric furnace contains more nitrogen than that manufactured by other furnaces and is more fragile.

I have made various experiments with a view to eliminating fragility of the product and I have succeeded by finally utilizing boron or ferro-boron.

In the manufacture of steel as hitherto proposed, ferro-silicon, ferro-manganese, aluminium or mixtures of these metals are used as deoxidizing agent, but it is hardly possible to produce steel containing a low percentage of nitrogen for the reason that each of the above metals are very poor in their affinity for nitrogen, and moreover these metals very often contain a certain quantity of nitrogen.

In case where ferro-titanium or ferro-vanadium is used as a deoxidizing agent, there arises of course more or less elimination of nitrogen, but it is not so energetic as in the case where boron is used.

In the present invention, to raw materials melted in an electric furnace or crucible furnace or the like at a suitably high temperature, or to the raw materials preliminarily melted and charged into the electric furnace or crucible furnace or the like, being maintained at suitable temperature, will be added boron or ferro-boron by a suitable method as hereinbefore described. In this case a portion of metallic boron combines with nitrogen contained in the molten iron or steel and enters into the surface slag, and thus by once or twice replacing the slag, I have obtained iron or steel containing a very low percentage of nitrogen.

I was aware that it might be possible to eliminate nitrogen contained in iron or steel to a certain extent by a method of heating and forging.

For instance, I first take a portion of a test sample of steel ingot manufactured in an electric furnace, which is conventionally designated as A. Next the ingot is annealed for a suitable time at a suitable temperature, which is designated as B, and then the ingot B is annealed and forged, which is designated as C; the material C is further annealed and forged, which is designated as D, and the material D is finally annealed and forged several times, which is designated as E. As to the percentage of nitrogen contained in the above five different samples, it was found that the percentage of nitrogen was highest in A, and became successively lower in the order of samples, being lowest in E. It is therefore evident that when annealing and forging are repeated on iron or steel, the percentage of nitrogen contained therein will be successively reduced. However, such treatment is very troublesome in producing iron or steel containing a low percentage of nitrogen as in the present invention, which has the purpose to produce such a characteristic at the time of making steel ingot from a molten charge. In other words, the present invention has a decided advantage over the above method in substantially eliminating nitrogen and in requiring no steps of annealing and forging.

The following table is to give a clear idea as to the result of comparative tests made on some samples which were available in the market and samples produced according to my invention.

| Test sample which was available in the market. | Carbon in per cent. | Nitrogen in per cent. | Description. |
|---|---|---|---|
| Electric steel | 0.41 | 0.0087 | Steel ingot. |
| Do | 0.60 | 0.0107 | Do. |
| Do | 0.90 | 0.0133 | Do. |
| Do | 1.40 | 0.0095 | Do. |
| Pig iron | 3.50 | 0.0070 | Ingot |
| Siemens steel | 0.45 | 0.0060 | Steel |
| Bessemer steel | 0.35 | 0.0040 | Hoop iron |
| Swedish iron | 0.15 | 0.0040 | |
| Dies steel | | 0.0039 | Chromium steel |
| Crucible steel | 0.63 | 0.0060 | |
| Piano wire | 0.35 | 0.0031 | Drawn wire. |
| Electric steel | 0.60 | 0.0035 | Steel ingot specially treated with ferro-titanium. |

| Test sample manufactured under my invention. | Carbon in per cent. | Nitrogen in per cent. | Description. |
|---|---|---|---|
| Electric steel | 1.24 | Trace | Ingot |
| Do | 1.15 | 0.00175 | Do. |
| Do | 0.90 | Trace | Do. |
| Do | 0.15 | 0.00200 | Do. |
| Do | 0.83 | 0.00150 | Do. |

Lastly I will describe the action of boron upon the elimination of phosphorus and sulphur in accordance with my invention. In the method of manufacturing iron or steel of a good quality or special steel, it is customary to use high grade raw materials. In case of employment of the electric furnace, there is elimination of phosphorus and sulphur in a treatment characterized in the electric furnace. The desulphuration is carried out when carbide is formed within the slag used on the surface of the molten charge in a reducing atmosphere and also, there is a necessity for maintaining the temperature of the furnace at a high temperature for a suitable period of about 30 minutes. But in this case it is difficult to manufacture a product of less percentage of carbon due to the fact that a certain amount of carbon is present in the slag in case of the formation of carbide on the surface of the latter and also, there arises deterioration of the furnace by the high temperature. It is also troublesome to eliminate phosphorus to less than 0.03 per cent, even though it may be possible to remove phosphorus to less than 0.01 per cent.

On the other hand such difficulties are obviated in my invention by the addition of boron or ferro-boron to molten metal within a crucible furnace or electric furnace or the like so that the phosphorus and sulphur are removed easily and effectively and in a short time of about 15 minutes, which fact has been proved by my investigation.

The following table shows the comparative tests made on iron and steel as to chemical analysis and mechanical tests.

| | B. in %. | C. in %. | P. in %. | S. in %. | Special metals. in %. | Tensile strength Kg/mm. | Elongation. per cent. |
|---|---|---|---|---|---|---|---|
| (1) | | 0.40 | 0.045 | 0.032 | Cr 5.00 | 37.8 | 24 |
| (2) | 0.09 | 0.40 | 0.021 | 0.003 | Cr 5.00 | 42.3 | 25.6 |
| (3) | | 0.38 | 0.031 | 0.012 | Cr Ni 0.31 1.20 | 60.8 | 21 |
| (4) | 0.25 | 0.4 | 0.012 | 0.003 | Cr Ni 0.30 1.30 | 73.2 | 25 |
| (5) | | 1.01 | 0.052 | 0.042 | Cr 0.6 | 72.3 | 16 |
| (6) | 0.08 | 1.00 | 0.021 | 0.003 | Cr 0.6 | 81.0 | 20 |
| (7) | | 0.4 | 0.038 | 0.018 | Cr W 1.02 0.5 | 73.5 | 24 |
| (8) | 0.09 | 0.4 | 0.018 | 0.003 | Cr W 1.1 0.5 | 78.8 | 25.5 |
| (9) | | 0.15 | 0.032 | 0.062 | | 34.72 | 31 |
| (10) | 0.07 | 0.15 | 0.017 | 0.0027 | | 41.73 | 41.66 |

The symbols mentioned in first four columns and the column of special metals in the above table represent usual chemical symbols and each of items of even numbers, (2), (4) etc. indicates steel manufactured in accordance with my invention, the raw materials used being the ordinary Siemens Martin steel scraps which contain about 0.05 per cent of sulphur and phosphorus, while (1), (3) etc. each represents a commercial sample close in quality to each of the samples (2), (4) etc.

In my process, it is evident that there may be added in the charge as above described, certain metals not interfering with the action of boron, such as tungsten, molybdenum, chromium, cobalt or nickel or a mixture of two or more of these metals. If desired, it is permissible to add together in the charge titanium, or vanadium, which has a characteristic of eliminating some nitrogen.

What I claim:

1. A method of manufacturing iron and steel having a low manganese content, from manganese containing ferrous materials, comprising, adding to the said ferrous materials, during the deoxidation stage, a boron containing material.

2. A method of manufacturing iron and steel according to claim 1, the ferrous material being subjected to a preliminary deoxidization.

3. A method of manufacturing iron and steel according to claim 1, tungsten, molybdenum, chromium, cobalt, nickel, titanium or vanadium being added to the molten charge.

4. A method of manufacturing iron and steel according to claim 1, the ferrous material being subjected to a perliminary deoxidization, tungsten, molybdenum, chromium, cobalt, nickel, titanium or vanadium being added to the molten charge.

5. A method of manufacturing iron and steel comprising desulphurizing and dephosphorizing the molten charge by adding thereto a boron containing material, said molten charge being subjected to a preliminary oxidizing material.

6. A method of manufacturing iron or steel comprising, desulphurizing, dephosphorizing and denitrating the molten charge by adding thereto a boron containing material, said molten charge being subjected to a preliminary oxidizing treatment.

7. A method of manufacturing iron and steel comprising adding to the molten mass, a compound of boron oxides and deoxidizing agents.

Signed at the Embassy of the United States of America in the Empire of Japan this 26th day of September A. D. 1921 in presence of two witnesses.

TAKEO MIYAGUCHI.

Witnesses:
HIGORO WATANABE,
EUGENE H. DOOMAN.